Dec. 4, 1923.
I. H. HALL
EGG SEPARATOR
Filed March 3, 1923
1,476,249
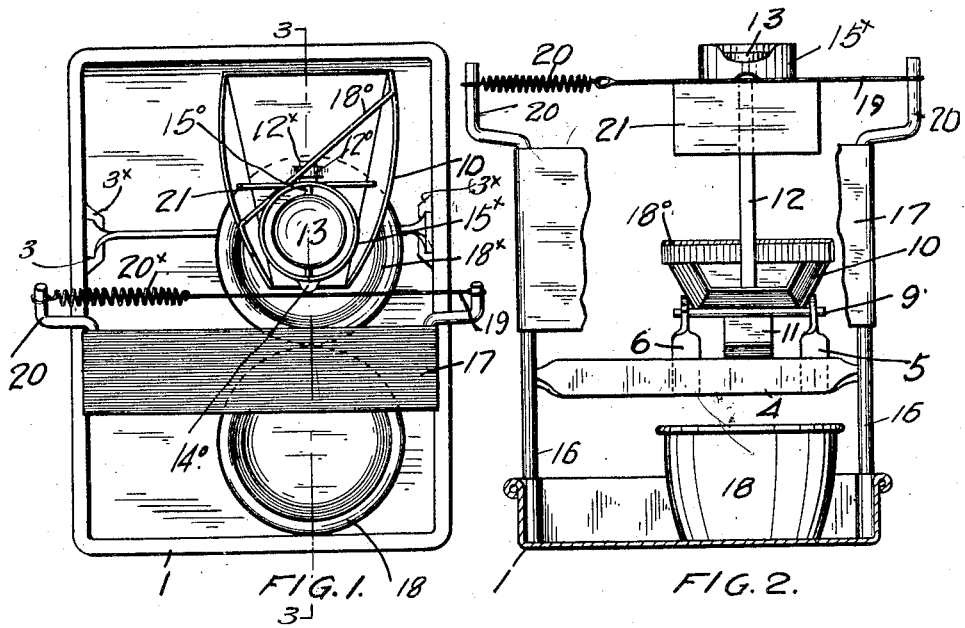
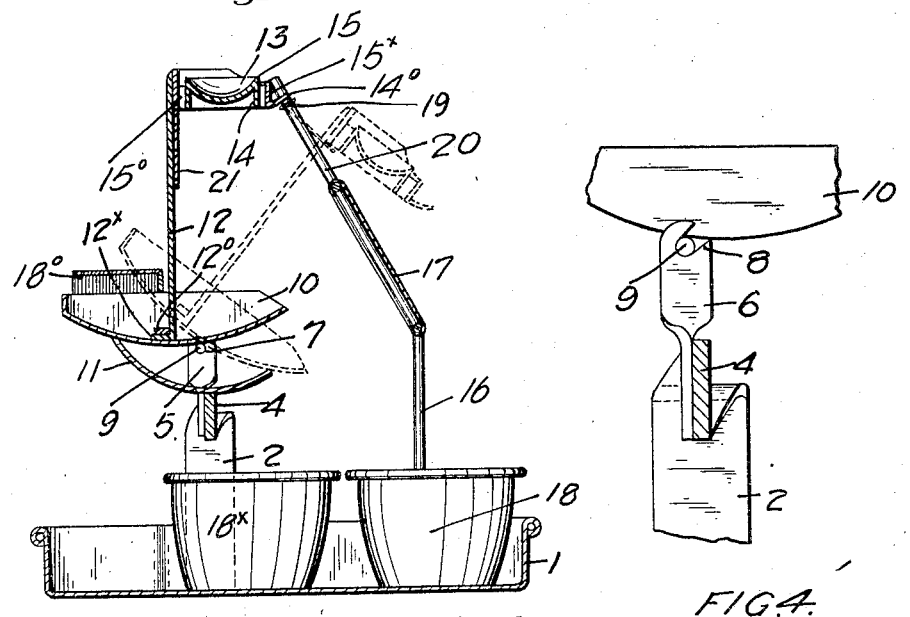
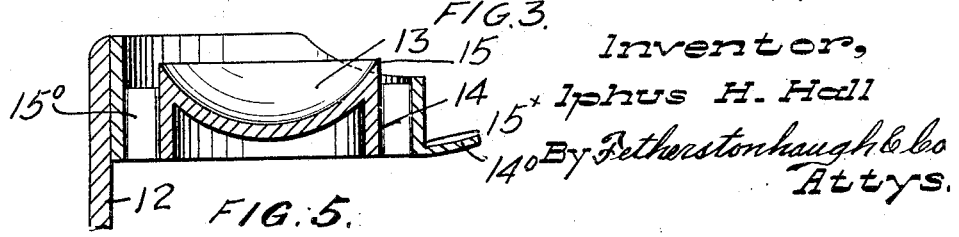
Inventor,
Iphus H. Hall
By Fetherstonhaugh & Co
Attys.

Patented Dec. 4, 1923.

1,476,249

UNITED STATES PATENT OFFICE.

IPHUS HARVEY HALL, OF TORONTO, ONTARIO, CANADA.

EGG SEPARATOR.

Application filed March 3, 1923. Serial No. 622,613.

*To all whom it may concern:*

Be it known that I, IPHUS HARVEY HALL, a citizen of the United States, and a resident of the city of Toronto, in the county of York, in the Province of Ontario, Canada, have invented certain new and useful Improvements in Egg Separators, of which the following is the specification.

My invention relates to improvements in egg separators and the object of the invention is to devise easy and quick means which will simplify the operation of breaking eggs and separating the whites from the yolks, which operation may be performed automatically and by which the broken egg may be held for the purpose of inspection and out of contact with other eggs previously broken until such egg has been passed as free from physical defects and also to provide such a device in which the white may be readily separated from the yolk no matter whether in a warm state or in a cold somewhat gelatinous state when brought from cold storage and it consists essentially of the arrangement and construction of parts as hereinafter more particularly explained.

Fig. 1 is a plan view of my device.

Fig. 2 is a front elevation showing the slipway broken away.

Fig. 3 is a cross sectional view of my separator on line 3—3, Fig. 1.

Fig. 4 is a detail of the slotted supporting bracket.

Fig. 5 is an enlarged sectional detail of the separating cup.

In the drawings like characters of reference indicate corresponding parts in each figure.

1 indicates the main tray. 2 are standards fitting in slots 3 formed in inwardly turned portions 3× of the tray. 4 is a bar connecting the standards 2 together and set edgewise and provided with brackets 5 and 6. The bracket 5 is provided with an orifice 7 and the bracket 6 with an inclined slot 8. 9 is a rocking rod fitting at one end in the orifice 7 and at its opposite end in the inclined slot 8. 10 is a pan supported intermediately of its length upon the rocking rod 9. The support of the pan 10 is placed off centre to normally hold the pan down on its rear end when set in its normal position.

11 is a curved stop bar carried by the bar 4 and upon the rear end of which the rear end of the pan 10 bears to support it in the aforesaid position, that is, in the horizontal or receiving position. 12 is a standard extending upward from the centre of the pan and upon the upper end of which is carried the yolk receiving cup 13. The lower end of the standard 12 is provided with a foot 12× adapted to be inserted in a loop 12° secured to the bottom of the pan 10.

By this means the standard 12 is detachably connected to the pan so that it may be removed when it is desired to break eggs directly into the pan 10. 14 is an annular flange or apron depending from the edge of the cup 13 which edge is sharpened as indicated at 15 for a purpose which will hereinafter appear.

15× is an annular member concentric with and spaced from the flange 14. 15° are webs extending between the flange 14 and member 15× whereby such member is supported. 14° is an upwardly curved lip extending outward from the member 15× in the direction of tilt of the pan 10. 16 are standards extending upward from the pan 1 and carrying an inclined plate or slipway 17. 18 is a yolk receiving pan into which the yolks are discharged from the cups 13. 18× is a receiving pan for the white of the egg. 18° is a stationary knife carried by the pan 10 and upon the edge of which the shells of the eggs are broken.

In separating the whites from the yolks the egg shell is broken upon the knife 18° and the contents allowed to drop into the cup 13. The cup is of such a size as to approximately just contain the yoke of an average size egg.

The member 15× serves as a support for the yoke of a large egg preventing its spilling over the edge of the cup.

It will be readily understood that the yoke of a large egg would spread over the edge of a cup and if the overhanging portion were not supported it would in many cases be broken allowing the yoke to mix with the separated white.

In eggs which are warm or in normal condition and the white therefore unthickened such white flows over the edge of the cup and down the flange or apron 14, the sharp edge of the cup serving to definitely separate or cut away the white from the yoke as the white falls downward and is received by the pan 10.

In the case of eggs which have been frozen and the white become thickened into a gelatinous state after being in cold storage I provide for the purpose of severing such thickened white from the yoke a draw wire 19 carried by the arms 20 and normally extending beneath the front portion of the lip 14° and provided with a tension spring 20× at one end only.

21 is a plate carried by the standard 12. As the pan 10 is tilted into the dotted position shown in Fig. 3 the wire 19 passes beneath the cup 13 and member 15×, the pressure of which forces the wire into tension and the pull being from one end of the wire exerts a draw cut as it is carried into contact with the egg white and against the plate severing the major portion of the white from the yolk.

It will thus be seen that the yoke and the white of the egg are held separate and convenient for inspection so that any physical defects are readily detected before the egg is mixed with the other eggs previously broken.

When the broken egg has been inspected the pan 10 is tilted to the position shown by dotted lines in Fig. 3, the white of the egg passing over the open end of the pan 10 into the receiving pan 18×. The yoke is discharged from the cup 13 and slides down the slipway 17 into the receptacle 18.

From this description it will be seen that I have devised a very simple device whereby the whites are automatically separated from the yokes without unnecessary handling or manipulation and by which the whites and yokes are held separate for the purpose of inspection before being subsequently discharged into the mass of eggs previously broken.

What I claim as my invention is:

1. An egg separating device comprising a main support, a yoke receiving cup into which the yoke substantially fits and over the edge of which the white overflows, a white receiver in which the separated white passes, and means for simultaneously discharging the separated yoke and white into separate receptacles.

2. An egg separating device comprising a main support, a yoke receiving cup in which the yoke substantially fits and over the edge of which the white overflows, an annular member surrounding the cup and spaced apart therefrom, a white receiver, and means coacting with the cup for separating the white overflowing the edges thereof from the yoke retained in the cup.

3. An egg separating device comprising a main support, a yoke receiving cup in which the yoke substantially fits and over the edge of which the white overflows, and a draw wire supported horizontally and over which the cup is passed in contact therewith to separate the overflowing white from the yoke.

4. An egg separating device comprising a main support, a yoke receiving cup in which the yoke substantially fits and over the edge of which the white overflows, a draw wire supported horizontally and over which the cup is passed in contact therewith to separate the overflowing white from the yoke, and means for exerting resilient tension upon the wire from one end.

5. An egg separating device comprising a main support, a yoke receiving cup in which the yoke substantially fits and over the edge of which the white overflows, a tiltably mounted white receiver over which the aforesaid cup is carried, and a draw wire extending across the path of the cup and over which the cup is passed in contact by the aforesaid tilting movement.

6. An egg separating device comprising a main support, a yoke receiving cup in which the yoke substantially fits, an annular flange or apron depending from the edge of the cup having a sharpened upper edge whereby the white is separated and sheared from the yoke as the white overflows the cup, a white receiver, and means for discharging the yoke and the white simultaneously from the cup and the receiver.

7. In an egg separating device, a main support, a white receiving pan tiltably mounted off centre upon such support, a stop device for limiting the tilting movement of the pan, a yoke receiving cup, and means extending upward from the pan for supporting the cup.

8. In an egg separating device, a main support, a white receiving pan tiltably mounted off centre upon such support, a stop device for limiting the tilting movement of the pan, a yoke receiving cup, and means extending upward from the pan for detachably supporting the cup.

9. In an egg separating device, a main support, a white receiving pan tiltably mounted off centre upon such support, a stop device for limiting the tilting movement of the pan, a stem extending upward from the centre of the pan, a yoke receiving cup carried by the stem, an annular flange or apron surrounding the cup and forming the sharpened upper edge, and an inclined slipway for receiving the yoke to direct it to a suitable receptacle when the pan and cup are thrown to a tilted position.

10. In an egg separating device, a main support, a white receiving pan tiltably mounted off centre upon such support, a stop device for limiting the tilting movement of the pan, a stem extending upward from the centre of the pan, a yoke receiving cup carried by the stem, means for separating the white from the yoke as the white overflows the edge of the cup, and an inclined slipway for receiving the yoke to direct it to a suitable receptacle when the aforesaid pan and cup are thrown to the tilted position.

IPHUS HARVEY HALL.